United States Patent
Srinivasan et al.

(10) Patent No.: US 10,511,542 B2
(45) Date of Patent: Dec. 17, 2019

(54) MULTI-INTERFACE POWER-AWARE NETWORKING

(71) Applicant: Microsoft Technology Licensing, LLC, Redmond, WA (US)

(72) Inventors: Harish Srinivasan, Sammamish, WA (US); Javier N. Flores Assad, Bothell, WA (US); James C. Gray, Redmond, WA (US); David Richard Powell, Jr., Sammamish, WA (US); Benjamin M. Schultz, Bellevue, WA (US); Ryan Gregory Wood, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 323 days.

(21) Appl. No.: 15/179,856

(22) Filed: Jun. 10, 2016

(65) Prior Publication Data
US 2017/0359272 A1    Dec. 14, 2017

(51) Int. Cl.
*H04L 12/927* (2013.01)
*H04L 12/10* (2006.01)
*H04W 52/02* (2009.01)
*H04L 12/26* (2006.01)

(52) U.S. Cl.
CPC ............ *H04L 47/808* (2013.01); *H04L 12/10* (2013.01); *H04L 43/0876* (2013.01); *H04L 43/16* (2013.01); *H04W 52/0225* (2013.01)

(58) Field of Classification Search
CPC ... H04L 47/808; H04L 12/10; H04L 43/0876; H04L 43/16; H04W 52/0225

USPC ......................................................... 709/224
See application file for complete search history.

(56) References Cited

U.S. PATENT DOCUMENTS

| 6,122,514 | A | 9/2000 | Spaur et al. |
| 6,643,293 | B1 | 11/2003 | Carr et al. |
| 7,065,367 | B2 | 6/2006 | Michaelis et al. |
| 7,325,037 | B2 * | 1/2008 | Lawson ................ H04L 47/10 |
| | | | 709/203 |
| 7,555,663 | B2 | 6/2009 | Krantz et al. |
| 7,581,224 | B2 | 8/2009 | Romero |

(Continued)

FOREIGN PATENT DOCUMENTS

| EP | 2091190 A1 | 8/2009 |
| WO | WO2012099617 A1 | 7/2012 |

OTHER PUBLICATIONS

PCT/US2017/036026—International Search Report and Written Opinion dated Jul. 24, 2017, 14 pages.

(Continued)

*Primary Examiner* — David R Lazaro
*Assistant Examiner* — Berhanu Shitayewoldetadik
(74) *Attorney, Agent, or Firm* — Newport IP, LLC; Jacob P. Rohwer

(57) ABSTRACT

The techniques described herein monitor, store, and evaluate network information associated with an application to determine a connectivity option to use to communicate data. A connectivity option includes a network interface and a type of network connection. The determination is made based on power consumption information associated with available connectivity options. Consequently, a device on which the application is installed can better manage its power consumption associated with network communications.

20 Claims, 7 Drawing Sheets

(56) References Cited

U.S. PATENT DOCUMENTS

| | | | |
|---|---|---|---|
| 7,822,065 B2* | 10/2010 | Lu | H04W 88/02 370/328 |
| 7,849,183 B1* | 12/2010 | Haber | H04L 67/02 709/223 |
| 7,961,661 B2 | 6/2011 | Hargrave et al. | |
| 8,848,608 B1* | 9/2014 | Addepalli | H04W 4/046 370/328 |
| 8,943,335 B2 | 1/2015 | Holsen et al. | |
| 8,990,295 B2 | 3/2015 | Lau et al. | |
| 9,015,601 B2 | 4/2015 | Trombley-Shapiro et al. | |
| 9,065,765 B2 | 6/2015 | Alisawi | |
| 2002/0091826 A1 | 7/2002 | Comeau et al. | |
| 2002/0110084 A1 | 8/2002 | Butt et al. | |
| 2004/0003060 A1* | 1/2004 | Asoh | H04L 41/0806 709/220 |
| 2006/0015636 A1 | 1/2006 | Skraba et al. | |
| 2006/0072542 A1* | 4/2006 | Sinnreich | H04L 12/2854 370/351 |
| 2006/0221998 A1 | 10/2006 | Live et al. | |
| 2006/0294582 A1* | 12/2006 | Linsley-Hood | H04W 40/248 726/6 |
| 2007/0004393 A1* | 1/2007 | Forsberg | H04L 63/102 455/420 |
| 2007/0217409 A1 | 9/2007 | Mann | |
| 2007/0245352 A1 | 10/2007 | Ma | |
| 2008/0052387 A1* | 2/2008 | Heinz | H04L 41/5025 709/223 |
| 2008/0080419 A1* | 4/2008 | Cole | H04L 12/5692 370/329 |
| 2008/0080458 A1* | 4/2008 | Cole | H04W 48/18 370/342 |
| 2008/0301670 A1 | 12/2008 | Gouge et al. | |
| 2010/0115048 A1* | 5/2010 | Scahill | H04L 67/322 709/213 |
| 2010/0322265 A1 | 12/2010 | Gopinath et al. | |
| 2011/0022812 A1* | 1/2011 | van der Linden | G06F 9/5077 711/163 |
| 2011/0093725 A1 | 4/2011 | Theocharous et al. | |
| 2012/0131321 A1 | 5/2012 | Jitkoff et al. | |
| 2012/0173610 A1* | 7/2012 | Bleau | H04L 67/26 709/203 |
| 2013/0111038 A1* | 5/2013 | Girard | H04L 45/245 709/226 |
| 2013/0152175 A1* | 6/2013 | Hromoko | H04W 36/0011 726/5 |
| 2013/0201825 A1 | 8/2013 | Masputra et al. | |
| 2014/0126441 A1* | 5/2014 | Rai | H04W 52/0216 370/311 |
| 2014/0136680 A1* | 5/2014 | Joshi | H04L 43/026 709/224 |
| 2014/0155023 A1* | 6/2014 | Cole | H04L 12/5692 455/405 |
| 2014/0235244 A1 | 8/2014 | Hinman | |
| 2014/0280873 A1* | 9/2014 | Stickle | H04L 63/1433 709/224 |
| 2014/0304393 A1* | 10/2014 | Annamalaisami | H04L 43/04 709/224 |
| 2015/0245409 A1* | 8/2015 | Medapalli | H04W 76/20 370/329 |
| 2016/0012471 A1* | 1/2016 | Fisher | G06Q 30/0242 |
| 2016/0057206 A1* | 2/2016 | DeCusatis | H04L 67/10 709/203 |
| 2017/0171390 A9* | 6/2017 | Gray | H04M 1/642 |

OTHER PUBLICATIONS

Kaiser, et al., "Software Considerations to Manage and Optimize System Power", Published on: Jan. 2012, Available at: <<http://rtcmagazine.com/articles/view/102414>>, retrieved Oct. 16, 2015, 4 pgs.

Nirjon, et al., "MultiNets: A System for Real-Time Switching between Multiple Network Interfaces on Mobile Devices", In Journal of ACM Transactions on Embedded Computing Systems, vol. 9, Issue 4, Mar. 2012, pp. 1-25.

Tsao, et al., "On Effectively Exploiting Multiple Wireless Interfaces in Mobile Hosts", In Proceedings of the 5th International Conference on Emerging Networking Experiments and Technologies, Dec. 1, 2009, pp. 337-348.

* cited by examiner

MULTI-INTERFACE POWER-AWARE NETWORKING

BACKGROUND

A device often has multiple connectivity options that are associated with varying degrees of network performance. For example, a first connectivity option associated with a first network interface may provide higher throughput, less latency, and/or a more reliable connection (e.g., minimal lost packets, a minimal packet error rate, etc.), and therefore, the first connectivity option typically consumes more power. A second connectivity option associated with a second network interface may provide lower throughput, higher latency, and/or a less reliable connection, and therefore, the second connectivity option typically consumes less power.

To establish and/or maintain a network connection on behalf of an application installed on a device, conventional network protocol stacks typically select and/or utilize, if available, a network interface and/or a type of network connection that can provide higher performance (e.g., higher throughput, less latency, higher reliability, etc.), even if the application does not need high network performance. Stated another way, the device may not need the network interface and/or the type of network connection that can provide the higher performance because usability of the application (e.g., the user experience) will not suffer due to use of an alternative network interface and/or an alternative type of network connection that provides lower performance. That is, the lack of network performance may be insignificant to the user.

SUMMARY

The techniques described herein monitor, store, and evaluate network information associated with an application to determine (e.g., select) a connectivity option to use to communicate data. A connectivity option includes a network interface and a type of network connection. The determination is made based on power consumption information associated with available connectivity options. Consequently, a device on which the application is installed can better manage its power consumption associated with network communications.

In various examples described herein, application profiles and connectivity profiles are accessed and/or obtained in response to a request to establish a network connection or in response to an event that causes re-evaluation of a network connection previously established (e.g., currently being maintained). An application profile is maintained in a policy store and the application profile describes network performance requirements for an application. The network performance requirements can be determined by a remote monitoring service based on network traffic patterns implemented on behalf of the application across a number of devices. A connectivity profile associated with a network interface can also be stored in the policy store and the connectivity profile includes information such as types of network connections that can be established by the network interface, expected power consumption of an individual type of network connection, expected performance of an individual type of network connection, and a current location of the device. In some examples, the information in a connectivity profile can be based on the current location of the device.

The techniques can determine whether the network performance requirements for the application are satisfied by the expected performance of various connectivity options and can select a connectivity option to communicate data on behalf of the application. The techniques can also determine that an expected power consumption of a first connectivity option is less than an expected power consumption of a second connectivity option, and the selection of a power saving connectivity option can be made as long as the application's network performance requirements are satisfied.

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
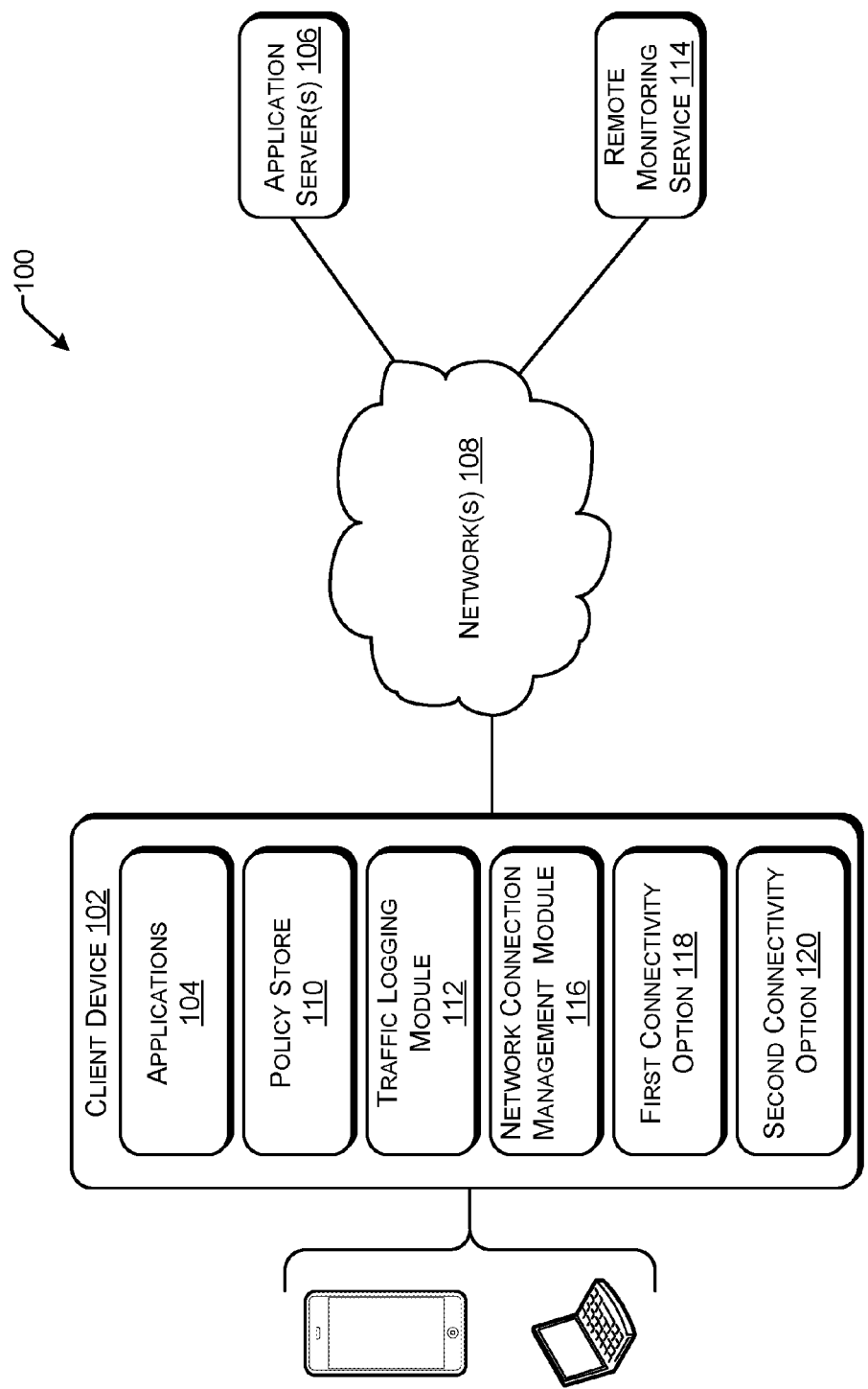
FIG. 1 illustrates a block diagram that illustrates an example environment in which multi-interface power-aware networking can be implemented, as described herein.

The present application describes a network connection management module integrated within an operating system of a client device, for example. The network connection management module is configured to determine which connectivity option to use to communicate data (e.g., send and/or receive data) on behalf of an application executing on the client device, where a connectivity option includes a particular network interface (e.g., Wi-Fi network interface, a mobile broadband (MBB) network interface, an Ethernet interface, etc.) and/or a type of network connection to use (e.g., IEEE 802.11g, IEEE 801.11ac, etc.)

As described above, a first type of network connection established and/or maintained by a first network interface of a client device can provide better performance (e.g., higher throughput, less latency, and/or more reliability, etc.) compared to a second type of network connection established and/or maintained by a second network interface of the client device (e.g., which provides lower throughput, higher latency, and/or less reliability). In this scenario, the client device likely consumes more battery power establishing and/or maintaining the first network connection using the first network interface compared to establishing and/or maintaining the second network connection using the second network interface.

When determining a connectivity option to use to communicate data for an application, the network connection management module described herein is configured to leverage information indicative of networking capabilities required or needed by the application to maintain an acceptable or optimal level of usage or service (e.g., may be referred to herein as "network performance requirements"). To this end, the network connection management module is configured to access network performance requirements for the application that are generated based on monitored network traffic patterns aggregated from a number of client devices (e.g., hundreds, thousands, millions, etc.) on which an application is installed and executed. The network performance requirements are stored in an application profile maintained in a policy store of the client device. The network performance requirements can be computed by a remote monitoring service which is configured to collect the network traffic patterns from the client devices, generate the network performance requirements, and then distribute the network performance requirements to the client devices.

In various implementations, the networking capabilities required or needed by the application may be associated with an execution state of the application. For example, a first execution state of the application can be associated with the application's active use of a display screen. If the application is a social media application that includes a video chat function, this first execution state may require or need real-time data communication so that two people can video chat without interruptions caused by networking problems (e.g., the network connection requires higher throughput, less latency, and more reliability so that the user experience will not suffer). A second execution state of the application (e.g., the social media application) can be associated with background execution in which the application is not actively using the display screen (e.g., the application is in a "screen off" mode), and thus, the application may only require or need a network connection to handle sparsely spaced push notifications. Therefore, a network connection with lower throughput, higher latency, and less reliability is acceptable with respect to a level of usage or service, particularly if the network connection consumes less battery power.

When determining a connectivity option to use to communicate data for an application, the network connection management module described herein is further configured to leverage information associated with power consumption and/or expected performance of a connectivity option. For instance, the network connection management module is configured to create and/or maintain a connectivity profile associated with a particular network interface. The connectivity profile can indicate (i) types of network connections available, (ii) how much power a client device is likely to consume to establish and/or maintain a network connection of a particular type, (iii) expected performance metrics of the network connection of the particular type such as latency (e.g., round trip time), jitter (e.g., variability in delay), throughput (e.g., packets per second, bits per second, etc.), and/or reliability (e.g., a packet error rate, a packet loss rate, etc.), and/or (iv) costs associated with the network connection (e.g., a free Wi-Fi connection vs. data usage costs associated with mobile broadband connection, etc.). In various examples, the likely power consumption and/or the expected performance metrics can be determined based on a strength of a signal and/or a current location of the client device with respect to a piece of networking equipment that emits a signal. Thus, the location of the current device and/or the strength of a signal can also be included in a connectivity profile. Moreover, the network connection management module is configured to update a connectivity profile as the client device moves from one location to another. Consequently, the techniques described herein are configured to leverage networking information about the application and the client device to make power-aware networking decisions in order to preserve power (e.g., battery life) of the client device.

The present application also describes a traffic logging module on the client device, which is configured to monitor device-specific network traffic patterns for an application installed on the client device and store the device-specific network traffic patterns in a corresponding application profile of the policy store. The traffic logging module is further configured to report the device-specific network traffic patterns to the remote monitoring service so that the remote monitoring service can combine the device-specific network traffic patterns with other network traffic patterns collected from other devices. In this way, the remote monitoring service can compute the network performance requirements for the application and distribute the network performance requirements to the client devices.

FIG. 1 illustrates a block diagram of an example environment 100 in which multi-interface power-aware networking can be implemented. A client device 102 includes applications 104 (e.g., may be referred to herein as an application 104) that are individually configured to communicate with a remote network-connected device, such as application server(s) 106. The client device 102 communicates with an application server 106 through one or more access network(s) 108. An example application 104 executing on the client device 102 can include a web browser, an email client, a file transfer protocol (FTP) client, a file server, a media player application, a gaming application, a social media application, a mobile phone application (e.g., an "app"), and so forth. An application server 106 can include a web server, an email server, an FTP server, a media server, a file server, a game hosting server and so forth. It can be common for a given client device 102 to run multiple applications 104 that communicate with multiple application servers 106.

The client device 102 can access these network(s) 108 utilizing any one of various wired or wireless communications technologies. Thus, an access network 108 can be any of various wireless networks including but not limited to: (i) any of various IEEE 802.11 Wireless local area network (LAN) compliant networks that use, for example, 802.11g Wi-Fi network connectivity, 802.11ac Wi-Fi network connectivity, etc., (ii) mobile communications networks such as Global System for Mobile Communications (GSM) networks, Universal Mobile Telecommunications System (UMTS) networks, Long-Term Evolution (LTE) networks, etc., or (iii) any of various satellite communication networks that use, for example, microwave radio frequencies such as Super High Frequency (SHF), Ultra High Frequency (UHF), etc. An access network 108 can also or alternatively include any one of various personal area networks including but not limited to IEEE 802.15, Bluetooth®, and so forth. An access network 108 can also or alternatively include wired connections, including but not limited to Ethernet networks, such as those defined by IEEE 802.3, fiber-optic networks, and so forth. An access network 108 can provide access to the public Internet or to other wide area networks (WANs), to campus area networks (CANs), to metropolitan area networks (MANs), to LANs, to data center networks (DCNs), and so forth. Servers and services connected to an access network 108 may directly connect, or do so via other networks such as the public Internet.

The client device 102 includes a policy store 110 that stores information useable to determine policy for the client device 102. For instance, the policy can be related to the establishment and maintenance of network connections (e.g., "networking" policies). Thus, the policy store 110 can store an application profile that corresponds to the application 104. The application profile stores network information indicative of networking capabilities required or needed by the application to maintain an acceptable or optimal level of usage or service, which can be tied to a user experience. In various implementations, the networking capabilities required or needed by the application may be associated with an execution state of the application (e.g., screen on execution state vs. screen off execution state, an execution state that is actively transmitting data vs. an execution state configured to receive sparsely spaced push notifications, data fetching execution state of a browser vs. data consumption state when a user is reading data presented by the browser, etc.). In various implementations, the application profile includes data from a local source such as a traffic logging module 112 and data from a remote source such as a remote monitoring service 114. Additionally, the application profile may be informed by information directly provided from the application.

The client device 102 further includes a traffic logging module 112. The traffic logging module 112 is configured to monitor device-specific network traffic patterns for the application 104 and store the device-specific network traffic patterns in the application profile of the policy store 110. As described above, actual network traffic patterns of the application can be used to determine network capabilities that an application requires or needs to maintain an acceptable or optimal level of usage or service (e.g., the user experience is not affected by networking issues or the effect due to networking issues is insignificant and/or unnoticeable). Accordingly, the traffic logging module 112 reports the device-specific network traffic patterns to a remote monitoring service 114 so that the remote monitoring service 114 can combine the device-specific network traffic patterns with other network traffic patterns collected from other client devices on which the application is installed. The remote monitoring service 114 can then compute network performance requirements based on the collected network traffic patterns and provide the network performance requirements to the client device 102 for storage in the application profile of the policy store 110. In various examples, the remote monitoring service 114 is configured to identify, in the collected network traffic patterns, instances when the network performance noticeably affects the level of use or service of the application (e.g., the user experience is frustrated by networking problems such as low throughput, increased latency, lost or dropped data packets, etc.). Minimum performance requirements can be set based on the identified instances.

In various examples, the network performance requirements can be descriptive of an acceptable and/or optimal manner in which data flows occur between communicating devices. As used herein, "flow" refers to data communication traffic which is defined by a communication session between two or more network-connected endpoints, such as an application 104 executing on a client device 102 and an application server 106. Network traffic patterns can include, but are not limited to: a network interface and/or a type of network connection used, an amount of time between data exchanges, an amount of data typically communicated (e.g., per a defined time interval), a typical amount of time that an application transmits and/or receives data, a type of data typically communicated, application functions that trigger network communications (e.g., a data burst), and so forth. Network traffic patterns can also describe performance-based factors used to communicate data, such as throughput, latency, reliability, and so forth.

Network traffic patterns can also include elements defined by a communication session. For example, a single communication session may be defined or determined by some or all of a 5-tuple of source address, destination address, protocol, source port, and destination port. The source and destination address may include an Internet Protocol (IP) address, such as an IP version 4 (IPv4) address or an IP version 6 (IPv6) address. Other source and destination address types may be utilized such as Media Access Control (MAC) addresses, or others. The protocol in the 5-tuple may include Transport Control Protocol (TCP), User Datagram Protocol (UDP), Stream Control Transmission Protocol (SCTP), Datagram Congestion Control Protocol (DCCP), or other protocol. These protocols may generally fall under or may be referred to as belonging in the "transport layer" of the Open Systems Interconnection (OSI) model, although such protocols may not strictly conform to the definitions provided by the OSI model for a transport layer protocol. To the extent that "transport layer" or other OSI model term (such as application layer, network layer, "layer 2", etc.) are used herein to describe a protocol or other concept, usage of these OSI terms are not meant to imply that any such protocol or concept strictly conforms to the definitions within the OSI model, although it is possible that such protocols or concepts do meet those definitions.

The destination port information in the 5-tuple may indicate various higher-layer protocols (e.g., application layer protocols under the OSI model). Such higher-layer protocols include, in some embodiments, hyper text transfer protocol (HTTP) (often but not necessarily indicated by TCP or UDP port 80), HTTP Secure (HTTPS) (often but not necessarily indicated by TCP or UDP port 443), FTP (often but not necessarily indicated by TCP or UDP port 20 (for data transfer) and port 21 (for FTP control)), Secure Shell (SSH) (often but not necessarily indicated by TCP or UDP port 22), Real Time Transfer Protocol (RTP) (often but not necessarily indicated by TCP or UDP port 5004). The higher-layer protocols may include various email-based protocols such as various versions of Post Office Protocol (POP, such as POP2, POP3) (often but not necessarily indicated by TCP or UDP port 109 (POP2) or port 110 (POP3), various versions of Internet Message Access Protocol (IMAP, such as IMAP4) (often but not necessarily indicated by TCP port 143), Microsoft® Messaging Application Programming Interface (MAPI) (often but not necessarily indicated by TCP or UDP port 135), Simple Mail Transfer Protocol (SMTP) (often but not necessarily indicated by TCP or UDP port 25), and so forth. Other example destination ports and associated higher-layer protocols may be used without departing from the scope of the embodiments described herein. There are tens of thousands of official, registered, and unofficial TCP and UDP ports defined and in use, and embodiments are not limited to one or more of them. Also, although a port number may be an official port for a particular protocol (as defined for example by the Internet Assigned Numbers Authority (IRNA)), other ports may be associated with a particular protocol. For example, although port 443 may be the official port for HTTPS, a client and an application server may be configured to utilize some other port number to indicate an HTTPS connection.

The source port information in the 5-tuple may be any port number associated with the packet. Source ports are often utilized by clients and application servers to distinguish traffic from amongst multiple application requests. Thus, where the same client device sends multiple packets having same source address, destination address, protocol, and destination port, but the packets have different source ports, the different source ports may indicate that the packets are associated with different communication sessions between the same client or client application and the application server. For example, web browser client software on a client device may establish two HTTP connections to the same application server, such as in two different browser windows, to obtain different web pages, and this may (although it might not) result in multiple source ports being utilized, and thus result in two application communication sessions. In various examples, one or more of the 5-tuple data may be used to define or determine an application communication session, such that all packets having the same 5-tuple (e.g., same source and destination address, protocols, and same source and destination ports) are treated as belonging to the same communication session, and thus to the same "flow."

The communication sessions may be determined or defined based on other data besides the above-described 5-tuple, such as higher-layer protocol data flow. In some embodiments, a connection may be determined from state information found in the higher-layer traffic flows. To use HTTP as an example, an HTTP session may be defined based on a client and an HTTP server exchanging a SYN, SYN_ACK, and ACK commands to request and accept a TCP session to be established between the client and server. These exchanges may be followed by exchanges of requests by the client for data from the server such as by issuing HTTP_GET commands and HTTP_200_OK replies, and other types of HTTP exchange communications. The HTTP session may end with an issuance of a FIN command and an ACK reply. Thus, embodiments may determine an application communication—or "flow"—based on such higher layer protocol flows.

A communication session can be determined or defined based on other data including: a user that is logged into the client device 102 during the communication session, the GPS coordinates during the communication session, a timestamp associated with an occurrence of the communication session, a communication session duration, etc.

These example group of communications—whether defined or determined based on some or all of the addresses/protocol/ports quintuple, higher-layer state information (such as HTTP or other state data as described above), some combination of the 5-tuple and higher-layer protocol data, other data as may be appropriate—represent a communication session, also referred to as a "flow."

The client device 102 further includes a network connection management module 116. The network connection management module 116 is configured to access and/or obtain, for evaluation and analysis purposes, the information in the policy store 110 (e.g., an application profile and connectivity profiles of network interfaces and available types of network connections) so that a determination can be made to use a first connectivity option 118 or a second connectivity option 120. Stated another way, the network connection management module 116 can rank connectivity options, and then select a network interface and/or a type of network connection to use, based on (i) what networking capabilities an application 104 needs or requires and (ii) power consumption factors. For example, the network connection management module 116 can determine to use a first network interface (e.g., a Wi-Fi interface) and a first type of network connection (e.g., a 802.11g connection) instead of a second network interface (e.g., a MBB interface) and a second type of network connection (e.g., a 4G connection). Or, the network connection management module 116 can determine to use the second network interface (e.g., a MBB interface) and the second type of network connection (e.g., a 4G connection) instead of the first network interface (e.g., a Wi-Fi interface) and the first type of network connection (e.g., a 802.11g connection). The network connection management module 116 can select the connectivity option that satisfies the network performance requirements needed by an application to maintain an acceptable or optimal level of service or usage (e.g., based on an execution state), yet also consumes the least amount of power thereby conserving the life of the battery powering the client device. Accordingly, the ranking or ordering of the connectivity options can be based on (i) an extent to which an expected performance of an option meets or satisfies required network performances and/or (ii) an amount of expected battery consumption.

In some instances, the network connection management module 116 determines to use both the first connectivity option 118 and the second connectivity option 120. That is, the network connection management module 116 can use multi-path TCP (MP-TCP) to maximize resource usage and increase redundancy.

To this end, the network connection management module 116 is configured to access network information for the application that is generated based on network traffic patterns used across a number of client devices (e.g., hundreds, thousands, millions, etc.) on which an application is installed in order to make a networking decision (e.g., a selection of a connectivity option associated with an available network 108 to establish a connection).

As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions.

Figure 2:
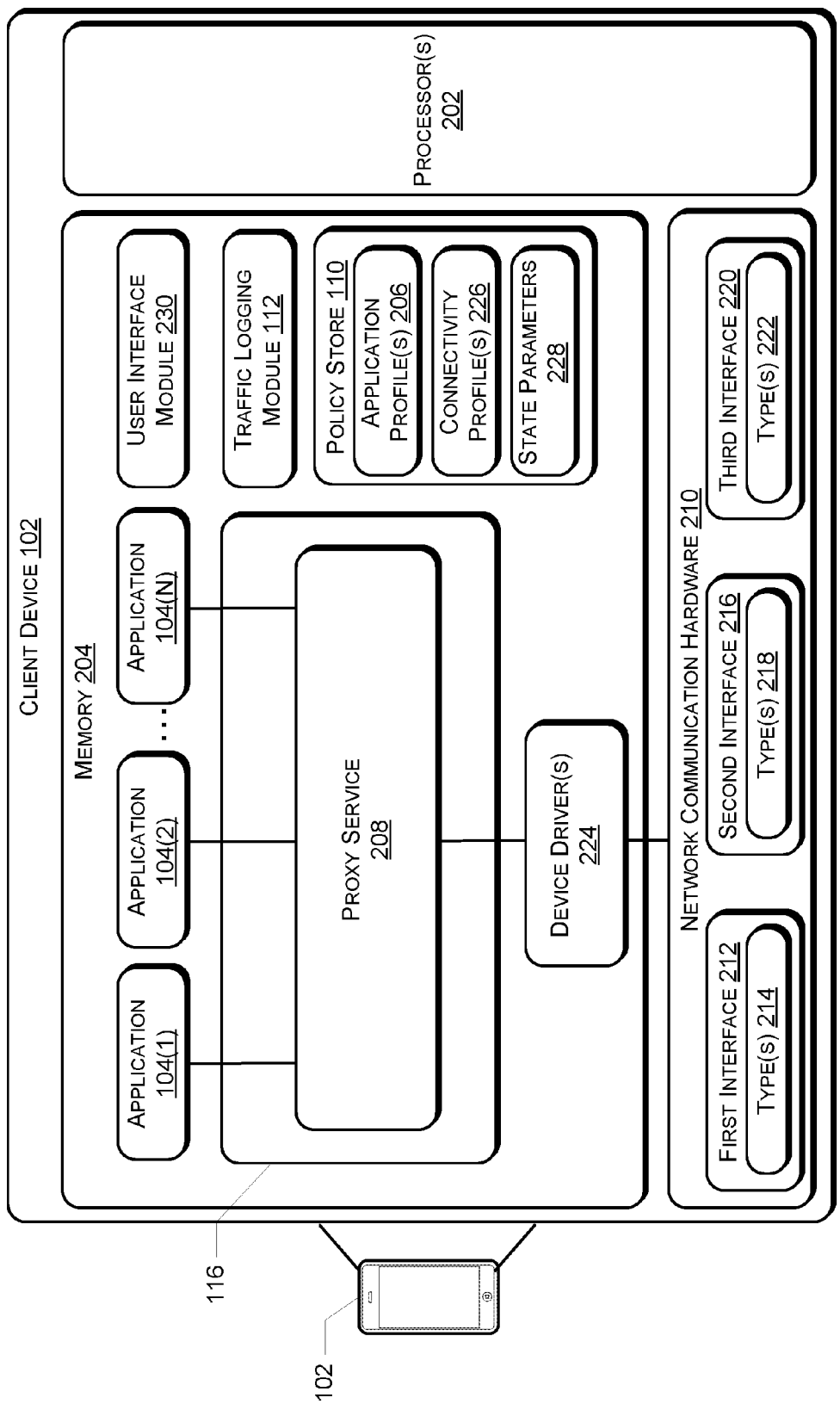
FIG. 2 illustrates a block diagram that illustrates an example client device that can implement multi-interface power-aware networking, as described herein.

FIG. 2 illustrates a block diagram of further example components of a client device 102 on which multi-interface power-aware networking can be implemented. The client device 102 of FIG. 2 can include the components illustrated in the client device 102 of FIG. 1. Moreover, the client device 102 can include one or more processor(s) 202 and memory 204, examples of which are described below. FIG. 2 illustrates applications 104(1) . . . 104(N) (e.g., where N is a positive number of applications installed on the client device). The policy store 110 includes the application profiles 206 stored in association with the applications 104(1) . . . 104(N). Thus, each application has a corresponding application profile 206 in which network usage information can be stored.

As described above, the traffic logging module 112 is configured to monitor network traffic patterns used by an application 104 with respect to a specific client device (e.g., client device 102). The traffic logging module 112 stores the network traffic patterns in the application profile 206 and also reports the network traffic patterns to the remote monitoring service 114 so that the remote monitoring service 114 can combine (e.g., aggregate) the network traffic patterns with other network traffic patterns collected from other client devices on which the application is installed. Consequently, the network performance requirements needed by the application 104 to maintain an acceptable or optimal level of usage or service can be generated. The network performance requirements are then received by the traffic logging module 112 from the remote monitoring service 114 and stored in the application profile 206. The network performance requirements can define: throughput (e.g., a minimum required throughput required for an application to function in an acceptable and/or optimal manner), latency (e.g., a maximum amount of latency allowed for an application to function in an acceptable and/or optimal manner), reliability (e.g., a maximum rate of dropped packets allowed for an application to function in an acceptable and/or optimal manner), and so forth.

The network connection management module 116 includes or is associated with a proxy service 208. As used herein, a "proxy" is a software and/or hardware element that acts as an intermediary between a client (e.g., an application 104) and a remote network-connected device (e.g., the application server 106). The proxy service 208 can communicate with the application 104, as if it were the resource that the application 104 is attempting to access. Upon receiving a connection attempt (e.g., an HTTP SYN) from the application 104 to access a resource, the proxy service 208 can reply as if it were the resource (e.g., send an HTTP SYN ACK back to the application 104).

Therefore, the proxy service 208 manages application flows and connectivity when a client device 102 is using one or more of various connectivity options to communicate (e.g., send and/or receive data). In various implementations, use of the proxy service 208 decouples the application management from the network connection management (e.g., the use of different types of network connections such as Wi-Fi, MBB, Ethernet, etc.). For instance, the proxy service 208 can represent multiple different network connections as a single connection and provide the single connection representation to an individual application. The proxy service 208 can then determine which network interface and/or which network connection to use based on the information in the policy store 110 so that a user experience is not noticeably affected by networking performance, yet device resources (e.g., battery life) can effectively be managed and conserved. In various examples, the proxy service 208 can use MP-TCP to maximize resource usage and increase redundancy. For instance, MP-TCP may use a Wi-Fi connection and a MBB connection to establish and maintain a flow for an application 104 executing on the client device 102.

Accordingly, the proxy service 208 may proxy communications between the applications 104(1) . . . 104(N) and the remote network-connected devices, such as an application server 106. The proxy service 208 can manage communication flows between the applications 104(1) . . . 104(N) and the remote network-connected devices in accordance with various power states of the client device 102. The proxy service 208 can also manage power management functions within the client device 102 on behalf of the applications 104(1) . . . 104(N). Example power management functions include powering on network communication hardware 210 using power management Application Programming Interfaces (APIs) or other operating system or network driver features, determining which connectivity option to use to establish and/or maintain a connection, and/or determining to switch from one connectivity option to another available connectivity option (e.g., based on a change in an execution state of an application, based on a determination that a user experience is suffering due to networking problems, etc.).

The network communication hardware 210 can include multiple connectivity options, made available based on the availability of different access networks 108 (e.g., depending on a current location of a client device 102). For instance, the network communication hardware 210 can include a first network interface 212 (e.g., a Wi-Fi interface) capable of establishing and maintaining different types 214 of network connections (e.g., any one of various IEEE 802.11 Wireless compliant connections). The network communication hardware 210 can include a second network interface 216 (e.g., a MBB interface) capable of establishing and maintaining different types 218 of network connections (e.g., a 3G connection, a 4G connection, etc.). The network communication hardware 210 can include a third network interface 220 (e.g., an Ethernet network card) capable of establishing and maintaining different types 222 of network connections (e.g., such as those defined by IEEE 802.3, etc.).

In various implementations, device driver(s) 224 can manage the network communication hardware 210. The network communication hardware 210 can have more than one associated device driver 224. Note that in some instances, one device driver 224 may manage multiple instances of network interfaces (e.g., network adapters), which may include multiple physical and/or virtual network adapters.

In various examples, the network connection management module 116 receives attempts or requests from the applications 104(1) . . . 104(N) to transmit data and/or to receive data (e.g., push notifications) and/or to implement background transfers from the remote network-connected devices. Such requests can be captured via an API or similar software construct. In these examples, the applications 104(1) . . . 104(N) are configured to make API calls to the network connection management module 116. In some instances, such requests may be intercepted by the network connection management module 116, such as by the proxy service 208.

The network connection management module 116 is also configured to generate and/or maintain, in the policy store 110, connectivity profile(s) 226 corresponding to different network interfaces and/or type(s) of network connections. In various examples, a connectivity profile 226 is associated with a network interface and can indicate (i) types of network connections that can be established by the network interface, (ii) how much power a client device is likely to consume to establish and/or maintain a particular type of network connection using the network interface, (iii) expected performance metrics of the particular type of network connection such as latency (e.g., round trip time), jitter (e.g., variability in delay), throughput (e.g., packets per second, bits per second, etc.), and/or reliability (e.g., a packet error rate, a packet loss rate, etc.), (iv) costs associated with the network connection (e.g., a free Wi-Fi connection vs. data usage costs associated with mobile broadband connection, etc.), and/or (v) connectivity to a relevant network resource or the Internet. In various examples, the likely power consumption and/or the expected performance metrics can be determined based on a current location of the client device and a strength of a signal emitted from nearby networking equipment of an available network. Thus, the current location of the client device and/or the strength of the signal can also be included in a connectivity profile. The network connection management module 116 can update a connectivity profile 226 as the client device moves from one location to another. The network connection management module 116 can use a connectivity profile 226 to determine a connectivity option to use, where the determined connectivity option satisfies the network performance requirements needed by an application (e.g., in a particular execution state) to maintain an acceptable or optimal level of service or usage, yet the connectivity option also consumes the least amount of power when compared to other available connectivity options. For instance, connectivity options can be ranked or ordered based on an ability to satisfy network performance requirements and/or an amount of power consumption, and a highest ranked option can be selected for use (e.g., an option that best satisfies the network performance requirements and/or consumes the least amount of power).

In various examples, the policy store 110 can maintain other parameters with respect to a state of the client device 102 (e.g., state parameters 228). The network connection management module 116 can access and evaluate the state parameters 228 when making a power-aware networking decision. For instance, state parameters 228 may relate to a power state of the client device 102. The power state may include a device power management mode, such as an active mode, a connected-idle mode, a connected-sleep mode, a disconnected-sleep mode, a radio-off mode, and so forth. To a user, one or more of the power modes may look like the client device 102 is "on," "wake," "asleep," "powered down," and so forth. A power state may also include a battery level, a state of being plugged into main electricity or grid power (e.g., plugged into a household or building power), a state of operating under battery power, and so forth. A power state may include a hardware state of the client device 102, such as the network communication hardware 210 of the client device 102 being powered up, powered down or low, a processor 202 being powered up, powered down or low, a memory 204 operating under a low-power mode, and so on. A power state of the client device 102 may include a software state of the device, such as certain software modules or components (including operating system components or modules) being stopped, suspended, operational, and so forth.

In various implementations, state parameters 228 that relate to an application 104 can be stored in the application profile 206. As described above, an execution state of the application can be associated with (e.g., mapped to) networking capabilities required or needed by the application 104. For instance, a first execution state of the application 104 can be associated with the application's active use of a display screen (e.g., controlled by a user interface module 230). If the application 104 is a social media application that includes a video chat function, this first execution state may require or need real-time data communication so that two people can video chat without interruptions caused by networking problems. Therefore, the network performance requirements may indicate that a network connection must have higher throughput (e.g., a pre-defined minimum amount of throughput), less latency (e.g., a pre-defined maximum amount of latency), and more reliability (e.g., a pre-defined maximum drop rate) so that the user experience will not suffer. A second execution state of the application 104 (e.g., the social media application) can be associated with background execution in which the application 104 is not actively using the display screen (e.g., the application is in a "screen off" mode), and thus, the application may only require or need a network connection to handle sparsely spaced push notifications (e.g., the network performance requirements are not as demanding compared to the first execution state).

Figure 3:
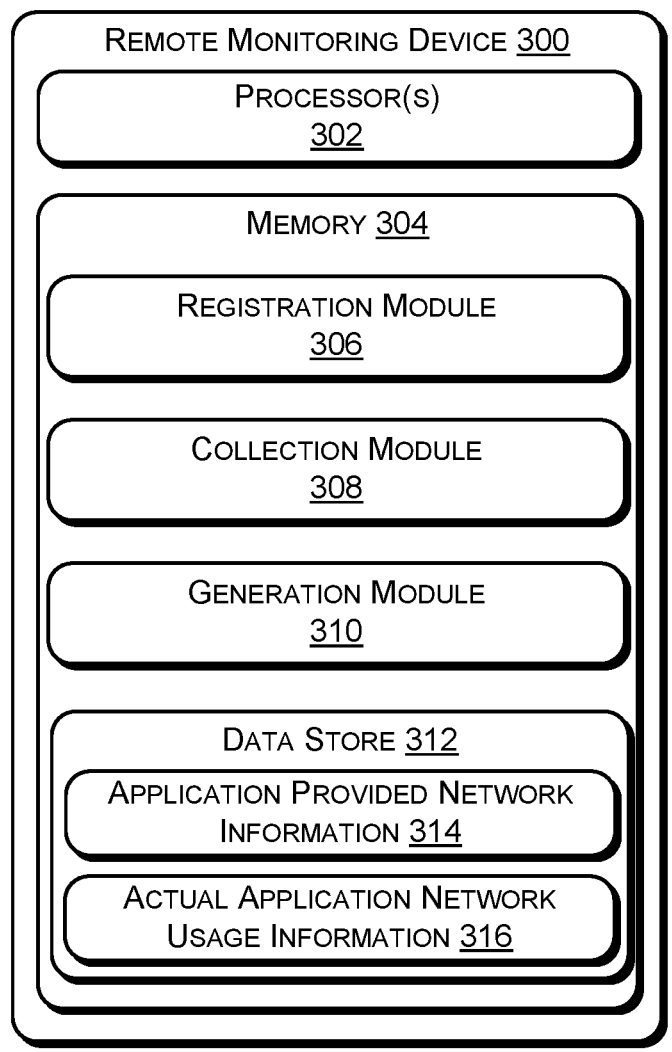
FIG. 3 illustrates a block diagram that illustrates an example remote monitoring device (e.g., a server) for collecting network usage information and/or generating networking performance requirements for an individual application, as described herein.

FIG. 3 illustrates a block diagram that illustrates an example remote monitoring device 300 (e.g., a server that is part of the remote monitoring service 114) for collecting network traffic patterns and/or calculating network performance requirements for an individual application. The remote monitoring device 300 can include one or more processor(s) 302 and memory 304, examples of which are described below. The memory 304 includes a registration module 306, a collection module 308, a generation module 310, and a data store 312.

The registration module 306 is configured to register an application 104 for monitoring services. For example, a developer of an application 104 may notify the remote monitoring service 114 of the distribution of the application 104 to a number of client devices. Moreover, the developer of the application 104 may also provide their own application provided network information 314 indicative of network traffic patterns the developer expects the application to require or need (e.g., based on varying execution states), which can be stored in the data store 312. The registration module 306 can then contact the traffic logging module 112 of a client device 102 (e.g., via use of device IDs provided by a developer of the application) so that the traffic logging module 112 knows to collect and report actual network traffic patterns implemented on behalf of the application on a specific device.

The collection module 308 is configured to collect the actual network traffic patterns from a large number of devices, aggregate the actual network traffic patterns, and store the actual network traffic patterns as actual application network usage information 316 in the data store 312. In various examples, the collection module 308 can associate a network traffic pattern with a particular application execution state. Network traffic patterns can include, but are not limited to: a network interface and/or a type of network connection used, an amount of time between data exchanges, an amount of data typically communicated (e.g., per a defined time interval), a typical amount of time that an application transmits and/or receives data, a type of data typically communicated, application functions that trigger network communications (e.g., a data burst), and so forth. Network traffic patterns can also describe performance-based factors used to communicate data, such as throughput, latency, reliability, and so forth. Network traffic patterns can also include elements defined by a communication session, as described above.

The generation module 310 computes network performance requirements based on the collected (aggregated) actual application network usage information 316 and/or the application provided network information 314, and the generation module 310 sends the network performance requirements to the client devices. The network performance requirements can be descriptive of an acceptable and/or optimal manner in which data flows occur between communicating devices. Therefore, network performance requirements can include thresholds for performance-based factors such as throughput (e.g., a minimum amount of throughput required for an application to function in an acceptable and/or optimal manner), latency, (e.g., a maximum amount of latency allowed for an application to function in an acceptable and/or optimal manner), reliability (e.g., a maximum rate of dropped packets allowed for an application to function in an acceptable and/or optimal manner), and so forth. In various examples, while computing the network performance requirements, the generation module 310 is configured to identify, in the collected network traffic patterns, instances when the network performance noticeably affects the level of use or service of the application (e.g., the user experience is frustrated by networking problems such as low throughput, increased latency, lost or dropped data packets, etc.). In some embodiments, the generation module 310 can compute network performance requirements for groups of commonly installed applications and account for interactions implemented on behalf of multiple applications (e.g., during simultaneous execution of the applications). For example, if multiple applications are receiving push notifications and an application server 106 is multiplexing the push notifications to be received by the client device 102 at the same time, the overall power and network characteristics can be different than if the application server 106 sends the push notifications individually. That is, the network performance requirements can be computed based on observed network interactions between an application and one or more other applications.

In various examples, the generation module 310 can also determine a priority for individual applications and rank applications according to priority, to be considered by a client device when determining networking policies. The priority can be determined based on the application provided network information 314 and the actual application network usage information 316. For example, lower priority applications have lower priority data traffic and higher priority applications have higher priority data traffic. The priorities (e.g., rankings) can be used by a client device when determining which application is provided with network I/O, using a higher performance network connection, for example. In some instances, an application's priority can be based on execution states.

FIGS. 4-7 depict flow diagrams that show example processes in accordance with various examples. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the processes. Processes according to various examples of the present disclosure may include only some or all of the operations depicted in the logical flow graphs.

Figure 4:
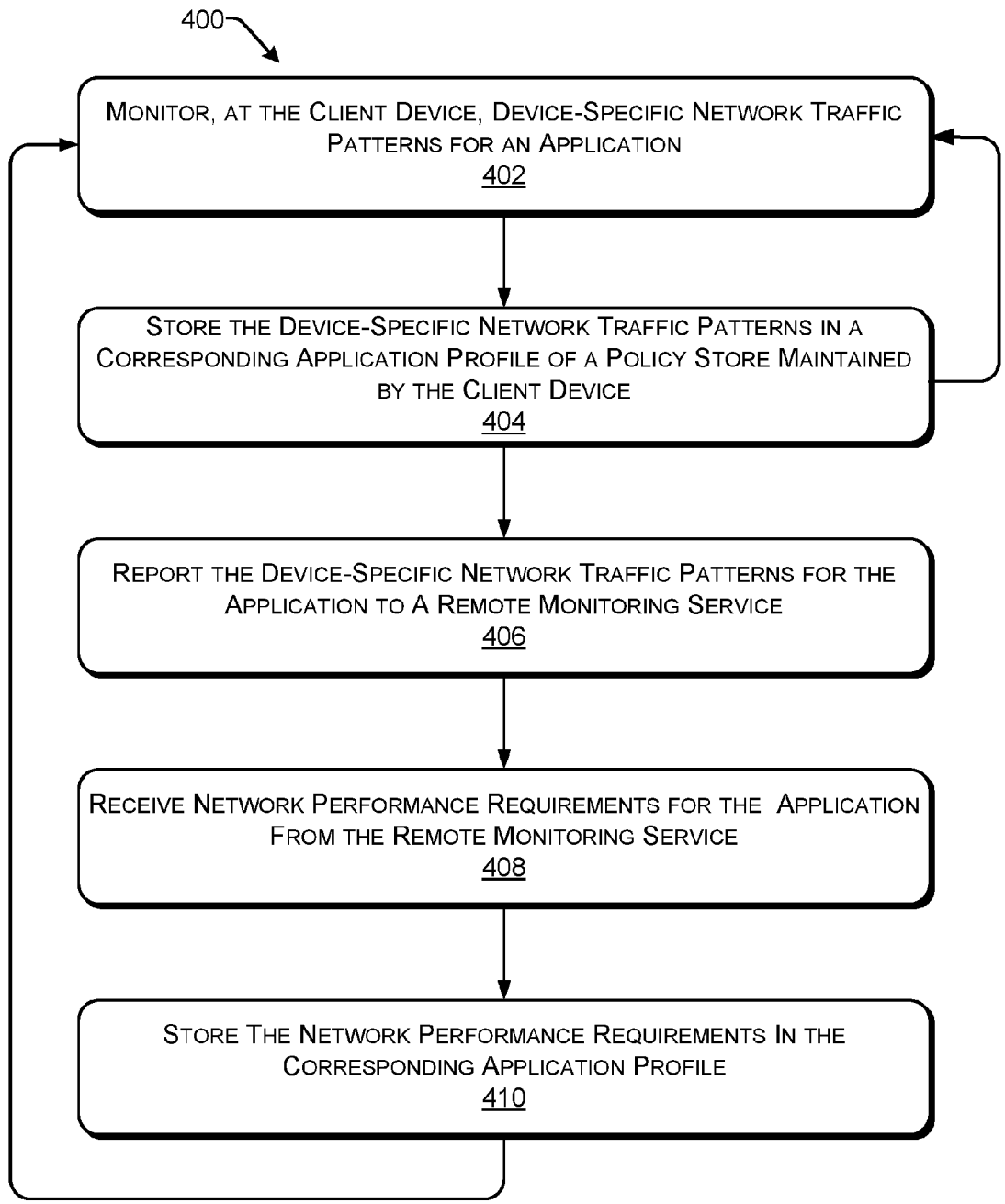
FIG. 4 illustrates a flow chart showing an example process implemented at an example client device for monitoring and reporting network usage information for an individual application, as described herein.

FIG. 4 illustrates a flow chart showing an example process 400 implemented at an example client device (e.g., client device 102) for monitoring and reporting network usage information for an individual application (e.g., application 104).

At 402, device-specific network traffic patterns for an application are monitored at a client device. For example, the traffic logging module 112 can monitor for a particular network interface and/or a type of network connection used for application communications, an amount of time between data exchanges, an amount of data typically communicated (e.g., per a defined time interval), a typical amount of time that the application transmits and/or receives data, a type of data typically communicated, application functions that trigger network communications (e.g., a data burst), and so forth. Further, network traffic patterns related to performance-based can be monitored by the traffic logging module 112, such as throughput, latency, reliability, and so forth. Even further, network traffic patterns based on elements defined in a communication session can be monitored by the traffic logging module 112.

At 404, the device-specific network traffic patterns are stored in an application profile of a policy store maintained by the client device. In various examples, the process can return to operation 402 where the monitoring and storing of device-specific network traffic patterns continues over a period of time (e.g., minutes, hours, days, weeks, etc.).

At 406, the device-specific network traffic patterns for the application are reported to a remote monitoring service.

At 408, network performance requirements for the application are received from the remote monitoring service. The network performance requirements are computed based on aggregation of network usage information for the application from a number of devices. The network performance requirements can be descriptive of an acceptable and/or optimal manner in which data flows occur between communicating devices. Therefore, network performance requirements can include thresholds for performance-based factors such as throughput (e.g., a minimum amount of throughput required for an application to function in an acceptable and/or optimal manner), latency, (e.g., a maximum amount of latency allowed for an application to function in an acceptable and/or optimal manner), reliability (e.g., a maximum lost packet rate or a maximum packet error rate allowed for an application to function in an acceptable and/or optimal manner), and so forth.

At 410, the network performance requirements are stored in the corresponding application profile of the application.

The process can then return to operation 402 where monitoring continues. In some instances, a client device 102 can receive the network performance requirements before performing its own local monitoring (e.g., at a time when a recently purchased device is first booted and before the user has used any applications installed on the device).

Figure 5:
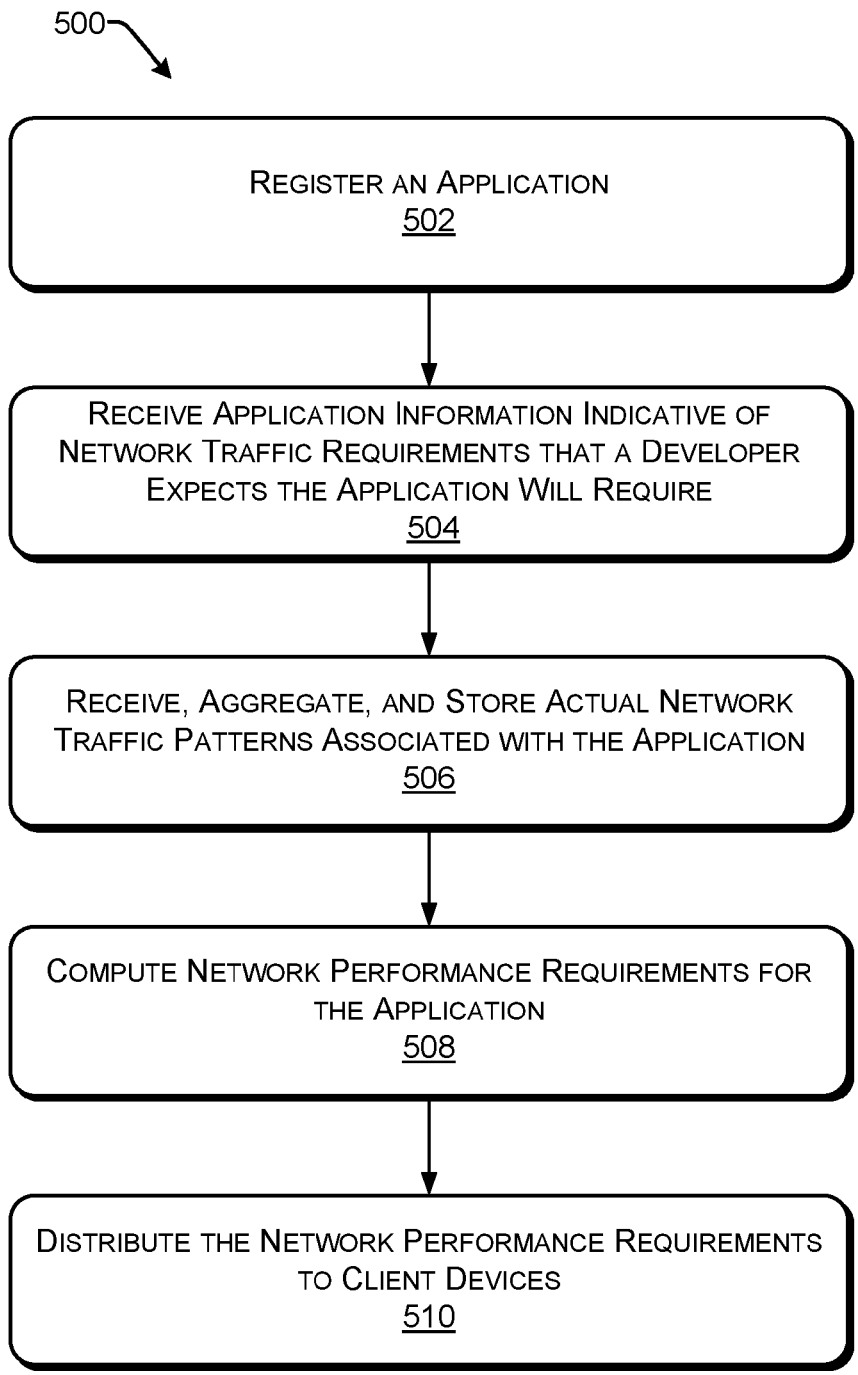
FIG. 5 illustrates a flow chart showing an example process implemented at an example remote monitoring device for collecting network usage information and/or computing networking performance requirements for an individual application, as described herein.

FIG. 5 illustrates a flow chart showing an example process 500 implemented at an example remote monitoring device (e.g., remote monitoring device 300) for collecting network usage information and/or generating networking performance requirements for an individual application.

At 502, a request to register an application is received. As described above, the request may be provided by a developer of the application. Moreover, the developer, in accordance with user agreements, can provide a list of device IDs on which the application is or is to be installed, and subsequently executed.

At 504, application information provided by the developer is received and stored (e.g., in a data store 312 as the application-provided network information 314). The application information can be indicative of network traffic patterns the developer expects the application to require or need (e.g., based on varying execution states of the application).

At 506, actual network traffic patterns associated with the application are received from a plurality of client devices, aggregated, and subsequently stored (e.g., in a data store 312 as actual application network usage information 316). This operation corresponds to operation 406 in the example process 400 of FIG. 4. Moreover, this operation can be implemented over a period of time (e.g., minutes, hours, days, weeks, etc.).

At 508, network performance requirements for the application are computed. For instance, the generation module 310 may analyze the collected network traffic patterns (e.g., the actual application network usage information), as well as the application provided network information 314, to determine a threshold set of network performance requirements that are to be satisfied so that a user experience associated with the application maintains a minimum level of service or performance.

At 510, the network performance requirements are distributed to client devices (e.g., the client devices that provided device-specific network traffic patterns and other client devices on which the application is installed but that did not provide device-specific network traffic patterns).

In addition, the network performance requirements computed based on actual network traffic patterns can be provided to a developer of an application so that the developer can improve its own network requirements model.

Figure 6:
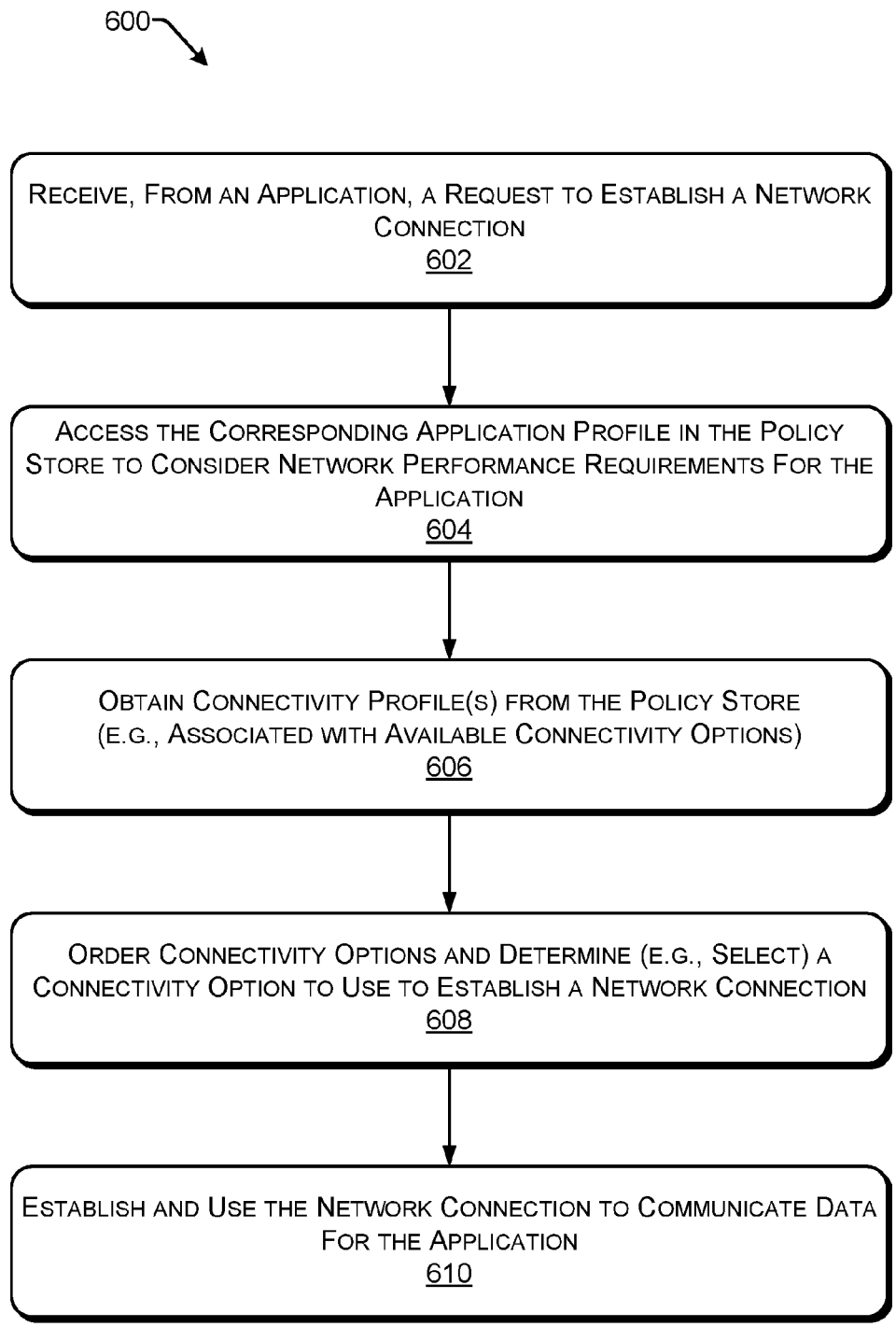
FIG. 6 illustrates a flow chart showing an example process implemented at an example client device for determining which network interface(s) and/or which types of network connection(s) to use to communicate data for an individual application installed on the example client device, as described herein.

FIG. 6 illustrates a flow chart showing an example process 600 implemented at an example client device for determining which network interface(s) and/or which types of network connection(s) to use to communicate data for an individual application installed on the example client device.

At 602, a request to establish a network connection is received from an application. For example, an application, as part of the request, may register with the network connection management module 116 by calling an API, opening a communication socket in an attempt to communicate using a network interface, or in some other way. The application may register to receive push notifications (to receive communications initiated by a remote network-accessible device) or to transmit data (e.g., initiate a communication flow).

At 604, a corresponding application profile maintained in the policy store is accessed. As described above, the application profile includes the network performance requirements for the application (e.g., based on a particular execution state of the application). To this end, the network connection management module 116 can consider the network performance requirements when making a networking decision. In some instances, the network connection management module is configured to adjust (e.g., calculate) the network performance requirements based on observed network interactions between the application and one or more other applications.

At 606, connectivity profiles maintained in the policy store are obtained. The connectivity profiles accessed may be based on network interfaces and can include connectivity options (e.g., types of network connections) that are currently available to the client device, where the connectivity option includes a combination of a network interface and a type of network connection. A connectivity profile describes expected power consumption (e.g., a power footprint) and expected performance of a network connection based on a current location of the device. In various implementations, the expected performance of the network connection can be determined using test packets and monitoring the performance (e.g., by the traffic logging module 112).

At 608, a connectivity option useable to establish a network connection is determined (e.g., selected amongst a plurality of different connectivity options). For instance, connectivity options can be ranked or ordered based on an ability to satisfy network performance requirements and/or an amount of power consumption, and a highest ranked option can be selected for use (e.g., an option that best satisfies the network performance requirements and/or consumes the least amount of power). Therefore, as part of the determination, the expected network performance of a connectivity option may have to satisfy thresholds set by the network performance requirements for the application (e.g., an expected throughput that exceeds a minimum amount of throughput, an expected latency that is less than a maximum amount of latency allowed, an expected jitter that is less than a maximum amount of jitter allowed, a packet error rate that is less than a maximum packet error rate allowed, a packet loss rate that is less than a maximum packet loss rate allowed, etc.). Note that in some embodiments, if the only connectivity option(s) available does not meet the expected network performance requirement, it may be determined that some network connectivity is better than no connectivity and the best available connectivity option can be selected.

In various examples, the determination in 608 is made based on expected power consumption. For instance, if each of two or more connectivity options has an expected network performance that satisfies the thresholds set by the network performance requirements, then the network connection management module 116 can compare and/or order the expected power consumptions of the connectivity options and select the connectivity option that is expected to consume the least amount of power thereby conserving batter life of the client device.

At 610, a network connection specified by the determined connectivity option is established and used to communicate data for the application.

Figure 7:
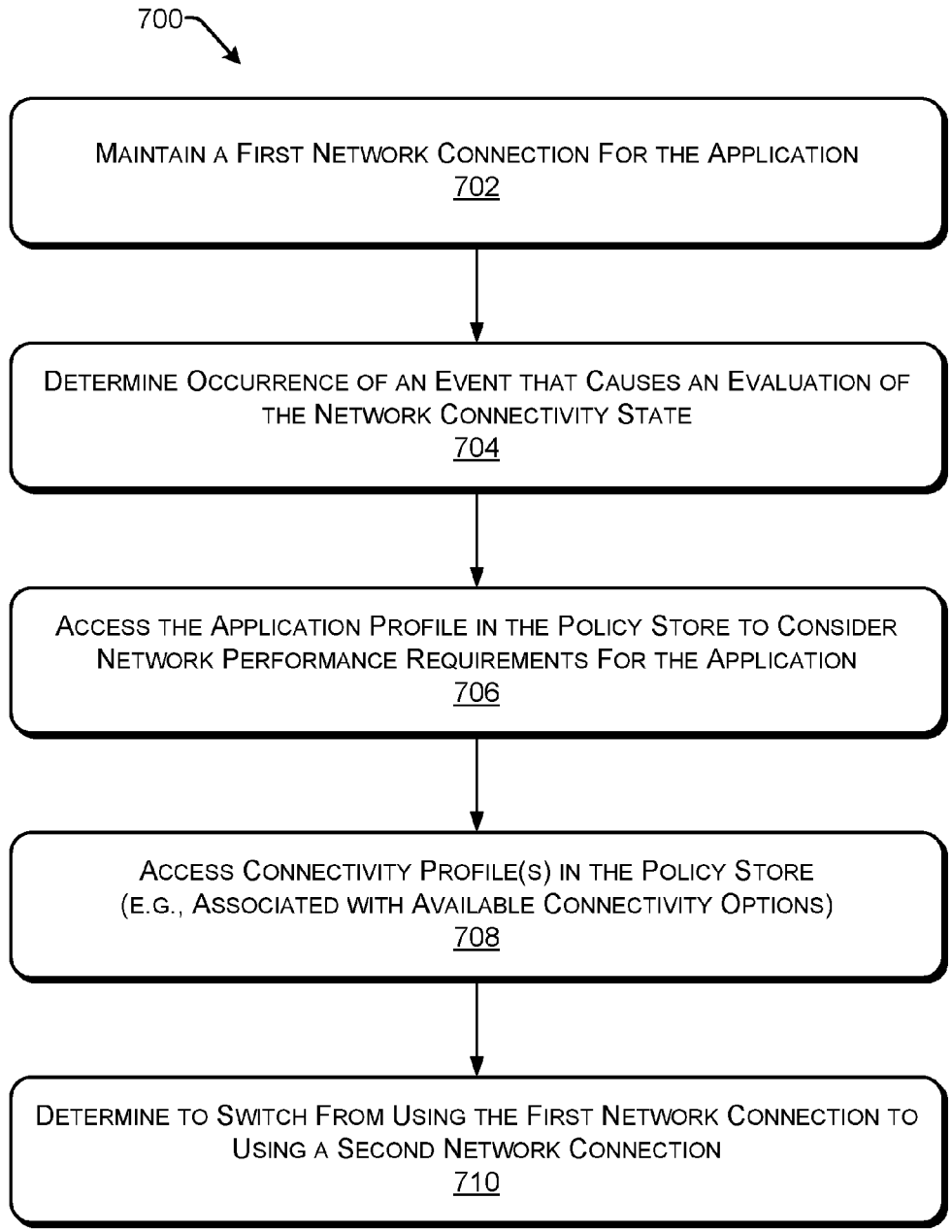
FIG. 7 illustrates a flow chart showing an example process implemented at an example client device for determining to switch from using a current connectivity option to using a new connectivity option to communicate data for an individual application installed on the example client device, as described herein.

FIG. 7 illustrates a flow chart showing an example process 700 implemented at an example client device (e.g., client device 102) for determining to switch from using a current connectivity option to using a new connectivity option to communicate data for an individual application installed on the example client device.

At 702, a first network connection is maintained for an application, the first network connection previously established to communicate data for the application executing on the device.

At 704, an occurrence of an event that causes an evaluation of the network connectivity state is determined. In one example, the event comprises movement of the device from a previous location to the current location (e.g., which can effect which networks are available and/or the strength of a signal that is available). In another example, the event comprises a state transition of the application from a previous execution state to the current execution state (e.g., indicating a shift in network performance requirements that may be needed). In yet another example, the event comprises a determination that the network connection being maintained is no longer satisfying previously determined network performance requirements for the application and as a result, the user experience is suffering (e.g., the level of usage or service is unacceptable). In yet an even further example, the event comprises expiration of a predetermined time interval. In some instances, an event can indicate that the device has drained the battery to such a low level (e.g., a threshold level) that power savings becomes the highest priority (with regard to network connectivity).

At 706, similar to operation 604 in the example process 600 of FIG. 6, an application profile maintained in the policy store is accessed to determine network performance requirements (e.g., for a current execution state of the application).

At 708, similar to operation 606 in the example process 600 of FIG. 6, connectivity profiles maintained in the policy store are accessed (e.g., the connectivity profiles may include updated information based on a changing location of the client device).

At 710, it is determined to switch from using the first network connection to communicate data for the application to using a second network connection to communicate data for the application. For example, the network connection management module 116 can determine that the network performance requirements for the application are satisfied by the expected performance of the second network connection and that the second network connection consumes less power compared to the first network connection, as well as other available network connections.

According to various non-limiting examples, the computing systems described herein (e.g., client devices 102, remote monitoring devices 300, application servers 106, etc.) include one or more devices that can connect to a network, such as servers, storage devices, tablet computers, laptops, desktop computers, gaming consoles, media players, mobile phones, handheld computers, wearable devices, smart appliances, networking equipment, kiosk devices, printers, cameras, sensors, and so forth. In one example configuration, the computing systems comprise at least one processor. The computing systems also contain communication connection(s) that allow communications with various other systems. The computing systems also include one or more input devices, such as a keyboard, a mouse, a pen, a voice input device, a touch input device, etc., and one or more output devices, such as a display (including a touch-screen display), speakers, a printer, etc. that can be communicatively coupled to the processor(s) and computer-readable media via connections such as a bus.

The memory 204 and 304 are examples of computer-readable media. Computer-readable media stores computer-executable instructions that are loadable and executable by one or more processor(s), as well as data generated during execution of, and/or usable in conjunction with, these programs. Computer-readable media can store operating system instances, which provide basic system functionality to applications 104, the policy store 110, the traffic logging module 112, the network connection management module 116, the proxy service 208, the device driver(s) 224, the user interface 230, and so forth. One or more of these components, including the operating systems, may be instantiated as virtual machines, application containers, or as some other type of virtualized instantiation.

Processor(s) 202 and 302 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, the computing systems may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media (e.g., memory 204 and 304) includes volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, Solid-State Drive (SSD) (e.g., flash memory), Hard Disk Drive (HDD) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PCM), Resistive RAM, 3D Xpoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Various processes described herein are carried out as computing functions in conjunction with networking functions. For example, one device or system may cause transmission of a message to another device via network communication hardware. This may include, for example, passing by a software module (e.g., an application 104) a pointer, argument, or other data to a networking module (e.g., the proxy service 208). The pointer, argument or other data may identify data stored in memory or in a register that is to be transmitted to another device. The networking module may include a protocol stack, and may read the data identified by the pointer, argument, or other data. The protocol stack may encapsulate the data in one or more frames, packets, cells, or other data networking protocol structures. The protocol stack (such as within the network power module or elsewhere) may call a network interface device driver, to cause physical transmission of electrical, magnetic, or optical signals along a communication medium to a network element, such as a gateway, router, switch, hub, and so forth. An underlying network may route or switch the data to the destination. The destination device may receive the data via a network interface card, which results in an interrupt being presented to a device driver or network adaptor. A processor of the destination device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination device. The software module receives an execution thread along with the argument, pointer, or other data, and reads the data from the identified location.

EXAMPLE CLAUSES

Clause A, a device comprising: one or more processors; a plurality of network interfaces configured to create and maintain a plurality of different types of network connections; memory storing a policy store of the device that maintains application profiles for a plurality of applications stored on the device; and a network connection management module stored on the memory and executable by the one or more processors, the network connection management configured to: receive, from one of the plurality of applications, a request to communicate data over a network; access an application profile associated with the one of the plurality of applications, the application profile describing network performance requirements for the one of the plurality of applications; for each network interface of the plurality of network interfaces, obtain a connectivity profile associated with the network interface, the connectivity profile including one or more types of network connections, an expected power consumption associated with an individual type of network connection, an expected network performance associated with an individual type of network connection, and information of a current location of the device; determine, based at least in part on the connectivity profiles obtained and the network performance requirements for the one of the plurality of applications, an order of connectivity options, wherein an individual connectivity option comprises a network interface and a type of network connection; select a connectivity option from the order of connectivity options; and use the network interface and the type of network connection of the selected connectivity option to communicate the data.

Clause B, the device of Clause A, wherein the selection of the connectivity option is based at least in part on the expected power consumption of the connectivity option being less than an expected power consumption of another connectivity option.

Clause C, the device of Clause A or Clause B, further comprising a traffic logging module stored on the memory and executable by the one or more processors to: monitor device-specific network traffic patterns for the one of the plurality of applications; report the device-specific network traffic patterns to a remote monitoring service that aggregates network traffic patterns for the one of the plurality of applications to generate the network performance requirements; receive, from the remote monitoring service, the network performance requirements for the application; and in response to receipt of the network performance requirements, update the application profile of the one of the plurality of applications.

Clause D, the device of Clause C, wherein the network connection management module is further configured to calculate the network performance requirements based on observed network interactions between the one of the plurality of applications and one or more other applications.

Clause E, the device of any one of Clause A through Clause D, wherein the network performance requirements for the one of the plurality of applications are based on an execution state of the one of the plurality of applications.

Clause F, the device of Clause E, wherein the execution state is based at least in part on whether the one of the plurality of applications is actively using a display screen to perform a function.

Clause G, the device of any one of Clause A through Clause F, wherein: the network performance requirements define, as a threshold to be satisfied, at least one of: a minimum amount of throughput, a maximum amount of latency, a maximum amount of jitter, a maximum packet loss rate, or a maximum packet error rate; and the network performance requirements are generated to ensure an acceptable level of usage of the one of the plurality of applications.

Clause H, the device of any one of Clause A through Clause G, further comprising a proxy service, the proxy service configured to manage application flows and decouple application management from network connection management.

While Example Clauses A through H are provided above with respect to a device, it is understood in the context of this document that the subject matter of Example Clauses A through H can be implemented via a method and/or via instructions stored on computer readable storage media.

Clause I, a device comprising: one or more processors; a plurality of network interfaces configured to create and maintain a plurality of different types of network connections; memory storing a policy store of the device that maintains application profiles for a plurality of applications stored on the device; and a network connection management module stored on the memory and executable by the one or more processors, the network connection management configured to: maintain a first network connection to communicate data for an application executing on the device, the first network connection being associated with a first connectivity option, wherein an individual connectivity option comprises a network interface and a type of network connection; determine an occurrence of an event that causes an evaluation of network connectivity; access an application profile associated with the application, the application profile describing network performance requirements for the application based on a current execution state of the application; obtain a first connectivity profile associated with the first connectivity option, the first connectivity profile describing expected performance and expected power consumption of the first network connection based on a current location of the device; obtain a second connectivity profile associated with a second connectivity option, the second connectivity profile describing expected performance and expected power consumption of a second network connection based on the current location of the device; determine that the network performance requirements for the application are satisfied by the expected performance of the second network connection; and based on the determination that the network performance requirements are satisfied by the expected performance of the second network connection, switch from using the first network connection to communicate data for the application to using the second network connection to communicate data for the application.

Clause J, the device of Clause I, wherein the event comprises movement of the device from a previous location to the current location.

Clause K, the device of Clause I, wherein: the event comprises a state transition of the application from a previous execution state to the current execution state; use of the second network connection consumes less power than use of the first network connection; and switching from using the first network connection to communicate data for the application to using the second network connection to communicate data for the application is based at least in part on the use of the second network connection consuming less power than the use of the first network connection.

Clause L, the device of Clause I, wherein the event comprises a determination that the first network connection is no longer satisfying previously determined network performance requirements for the application.

Clause M, the device of Clause I, wherein the event comprises expiration of a predetermined time interval.

Clause N, the device of Clause I, wherein the event comprises an indication that a current battery level is below a threshold battery level.

Clause O, the device of any one of Clause I through Clause N, wherein the first connectivity option and the second connectivity option use different network interfaces.

Clause P, the device of any one of Clause I through Clause N, wherein the first connectivity option and the second connectivity option use a same network interface but different types of network connections.

While Example Clauses I through P are provided above with respect to a device, it is understood in the context of this document that the subject matter of Example Clauses I through P can be implemented via a method and/or via instructions stored on computer readable storage media.

Clause Q, a method comprising: receiving, from one of a plurality of applications stored on a device, a request to communicate data over a network; accessing an application profile associated with the one of the plurality of applications, the application profile describing network performance requirements for the one of the plurality of applications; for each of a plurality of network interfaces of the device, obtaining a connectivity profile associated with the network interface, the connectivity profile including one or more types of network connections, an expected power consumption associated with an individual type of network connection, an expected network performance associated with an individual type of network connection, and information of a current location of the device; determining, based at least in part on the connectivity profiles obtained and the network performance requirements for the one of the plurality of applications, an order of connectivity options, wherein an individual connectivity option comprises a network interface and a type of network connection; selecting a connectivity option from the order of connectivity options; and using the network interface and the type of network connection of the selected connectivity option to communicate the data.

Clause R, the method of Clause Q, wherein the selection of the connectivity option is based at least in part on the expected power consumption of the connectivity option being less than an expected power consumption of another connectivity option.

Clause S, the method of Clause Q or Clause R, wherein the request is associated with a communication session, the communication session defined based on at least one of: a user that is logged into a device, global positioning system (GPS) coordinates, or a timestamp.

Clause T, the method of any one of Clause Q through Clause S, further comprising: monitoring device-specific network traffic patterns for the one of the plurality of applications; reporting the device-specific network traffic patterns to a remote monitoring service that aggregates network traffic patterns for the one of the plurality of applications to generate the network performance requirements; receiving, from the remote monitoring service, the network performance requirements for the application; and in response to receipt of the network performance requirements, updating the application profile of the one of the plurality of applications.

While Example Clauses Q through T are provided above with respect to a method, it is understood in the context of this document that the subject matter of Example Clauses Q through T can be implemented via a device and/or via instructions stored on computer readable storage media.

Clause U, a device comprising: means for receiving, from one of a plurality of applications stored on a device, a request to communicate data over a network; means for accessing an application profile associated with the one of the plurality of applications, the application profile describing network performance requirements for the one of the plurality of applications; for each of a plurality of network interfaces of the device, means for obtaining a connectivity profile associated with the network interface, the connectivity profile including one or more types of network connections, an expected power consumption associated with an individual type of network connection, an expected network performance associated with an individual type of network connection, and information of a current location of the device; means for determining, based at least in part on the connectivity profiles obtained and the network performance requirements for the one of the plurality of applications, an order of connectivity options, wherein an individual connectivity option comprises a network interface and a type of network connection; means for selecting a connectivity option from the order of connectivity options; and means for using the network interface and the type of network connection of the selected connectivity option to communicate the data.

Conclusion

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are within the scope of this disclosure and protected by the following claims.

What is claimed is:

1. A device comprising:
one or more processors;
a plurality of network interfaces; and
memory storing a policy store of the device that maintains application profiles for a plurality of applications stored on the device and instructions executable by the one or more processors to:
receive, from one of the plurality of applications, a request to communicate data over a network;
access a current execution state in an application profile associated with the one of the plurality of applications, the application profile associating the current execution state with network performance requirements that ensure an acceptable level of service for the one of the plurality of applications;
for each network interface of the plurality of network interfaces, obtain a connectivity profile associated with the network interface, the connectivity profile including one or more types of network connections, an expected power consumption associated with an individual type of network connection, an expected network performance associated with an individual type of network connection, and information of a current location of the device;
determine, based at least in part on the connectivity profiles obtained, an order of connectivity options that satisfy the network performance requirements for the one of the plurality of applications, wherein an individual connectivity option comprises a network interface and a type of network connection;
select a connectivity option from the order of connectivity options; and
use the network interface and the type of network connection of the selected connectivity option to communicate the data.

2. The device of claim 1, wherein the selection of the connectivity option is based at least in part on the expected power consumption of the connectivity option being less than an expected power consumption of another connectivity option in the order of connectivity options.

3. The device of claim 1, wherein the instructions are further executable by the one or more processors to:
monitor device-specific network traffic patterns for the one of the plurality of applications;
report the device-specific network traffic patterns to a remote monitoring service that aggregates network traffic patterns for the one of the plurality of applications to generate the network performance requirements;
receive, from the remote monitoring service, the network performance requirements for the one of the plurality of applications; and
in response to receipt of the network performance requirements, update the application profile of the one of the plurality of applications.

4. The device of claim 3, wherein the instructions are further executable to calculate the network performance requirements based on observed network interactions between the one of the plurality of applications and one or more other applications.

5. The device of claim 1, wherein the current execution state is based at least in part on whether the one of the plurality of applications is actively using a display screen to perform a function.

6. The device of claim 1, wherein the network performance requirements define, as a threshold to be satisfied, at least one of: a minimum amount of throughput, a maximum amount of latency, a maximum amount of jitter, a maximum packet loss rate, or a maximum packet error rate.

7. The device of claim 1, further comprising a proxy service, the proxy service to manage application flows and decouple application management from network connection management.

8. The device of claim 1, wherein the current execution state is based at least in part on real-time data communication associated with video chatting.

9. A device comprising:
one or more processors;
a plurality of network interfaces; and
memory storing a policy store of the device that maintains application profiles for a plurality of applications stored on the device and instructions executable by the one or more processors to:
maintain a first network connection to communicate data for an application executing on the device, the first network connection being associated with a first connectivity option, wherein an individual connectivity option comprises a network interface and a type of network connection;
determine an occurrence of an event that causes an evaluation of network connectivity;
access a current execution state in an application profile associated with the application, the application profile associating the current execution state with network performance requirements that ensure an acceptable level of service for the application based on the current execution state;

obtain a first connectivity profile associated with the first connectivity option, the first connectivity profile describing expected performance and expected power consumption of the first network connection based on a current location of the device;

obtain a second connectivity profile associated with a second connectivity option, the second connectivity profile describing expected performance and expected power consumption of a second network connection based on the current location of the device;

determine that the network performance requirements for the application are satisfied by the expected performance of the second network connection;

determine that the expected power consumption of the second network connection is less than the expected power consumption of the first network connection; and based on the determination that the network performance requirements are satisfied by the expected performance of the second network connection and the determination that the expected power consumption of the second network connection is less than the expected power consumption of the first network connection, switch from using the first network connection to communicate data for the application to using the second network connection to communicate data for the application.

10. The device of claim 9, wherein the event comprises movement of the device from a previous location to the current location.

11. The device of claim 9, wherein the event comprises a state transition of the application from a previous execution state to the current execution state.

12. The device of claim 9, wherein the event comprises a determination that the first network connection is no longer satisfying previously determined network performance requirements for the application.

13. The device of claim 9, wherein the event comprises expiration of a predetermined time interval.

14. The device of claim 9, wherein the event comprises an indication that a current battery level is below a threshold battery level.

15. The device of claim 9, wherein the first connectivity option and the second connectivity option use different network interfaces.

16. The device of claim 9, wherein the first connectivity option and the second connectivity option use a same network interface but different types of network connections.

17. A method comprising:

receiving, from one of a plurality of applications stored on a device, a request to communicate data over a network;

accessing a current execution state in an application profile associated with the one of the plurality of applications, the application profile associating the current execution state with network performance requirements that ensure an acceptable level of service for the one of the plurality of applications;

for each of a plurality of network interfaces of the device, obtaining a connectivity profile associated with the network interface, the connectivity profile including one or more types of network connections, an expected power consumption associated with an individual type of network connection, an expected network performance associated with an individual type of network connection, and information of a current location of the device;

determining, based at least in part on the connectivity profiles obtained and the network performance requirements for the one of the plurality of applications, an order of connectivity options, wherein an individual connectivity option comprises a network interface and a type of network connection;

selecting, by one or more processors, a connectivity option from the order of connectivity options; and using the network interface and the type of network connection of the selected connectivity option to communicate the data.

18. The method of claim 17, wherein the selection of the connectivity option is based at least in part on the expected power consumption of the connectivity option being less than an expected power consumption of another connectivity option in the order of connectivity options.

19. The method of claim 17, wherein the request is associated with a communication session, the communication session defined based on at least one of: a user that is logged into a device, global positioning system (GPS) coordinates, or a timestamp.

20. The method of claim 17, further comprising:

monitoring device-specific network traffic patterns for the one of the plurality of applications;

reporting the device-specific network traffic patterns to a remote monitoring service that aggregates network traffic patterns for the one of the plurality of applications to generate the network performance requirements;

receiving, from the remote monitoring service, the network performance requirements for the one of the plurality of applications; and in response to receipt of the network performance requirements, updating the application profile of the one of the plurality of applications.

* * * * *